United States Patent [19]

Kim

[11] Patent Number: 4,898,295

[45] Date of Patent: Feb. 6, 1990

[54] SPIN WELDED, TAMPER-PROOF, RESEALABLE THERMOPLASTIC CONTAINER

[76] Inventor: Dae Sik Kim, 49 Floral Street, Newton, Mass. 02161

[21] Appl. No.: 189,638

[22] Filed: May 3, 1988

[51] Int. Cl.$^4$ .............................................. B65D 6/00
[52] U.S. Cl. ..................................... 220/66; 220/4 B; 220/266; 220/276; 222/215
[58] Field of Search ................ 220/4 B, 66, 265, 266, 220/276, 379; 222/107, 206, 215, 563

[56] References Cited

U.S. PATENT DOCUMENTS

| | | | |
|---|---|---|---|
| 1,080,747 | 12/1913 | Buckley | 220/276 |
| 2,500,639 | 3/1950 | Lermer | 222/215 |
| 2,741,402 | 4/1956 | Sayre | 222/215 |
| 2,750,068 | 6/1956 | Platt | 220/265 |
| 3,275,179 | 9/1966 | Lux | 220/4 B |
| 4,057,177 | 11/1977 | Laauwe | 222/215 |
| 4,277,259 | 7/1981 | Rounbehler | 220/379 X |

*Primary Examiner*—Robert G. Nilson
*Attorney, Agent, or Firm*—Joseph S. Iandiorio

[57] ABSTRACT

An extremely economical, tamper-proof, resealable container is formed by spin welding (1) a molded thermoplastic cup with a circular opening, and (2) a similar thermoplastic molded cap with a matching circular base. The cup is filled with the contents before welding. An opening for the discharge of the contents is created by separating a predetermined part of the cap, and the separated part becomes a tight-fitting closure for the opening when the separated part is reversed and plugged into the opening.

12 Claims, 1 Drawing Sheet

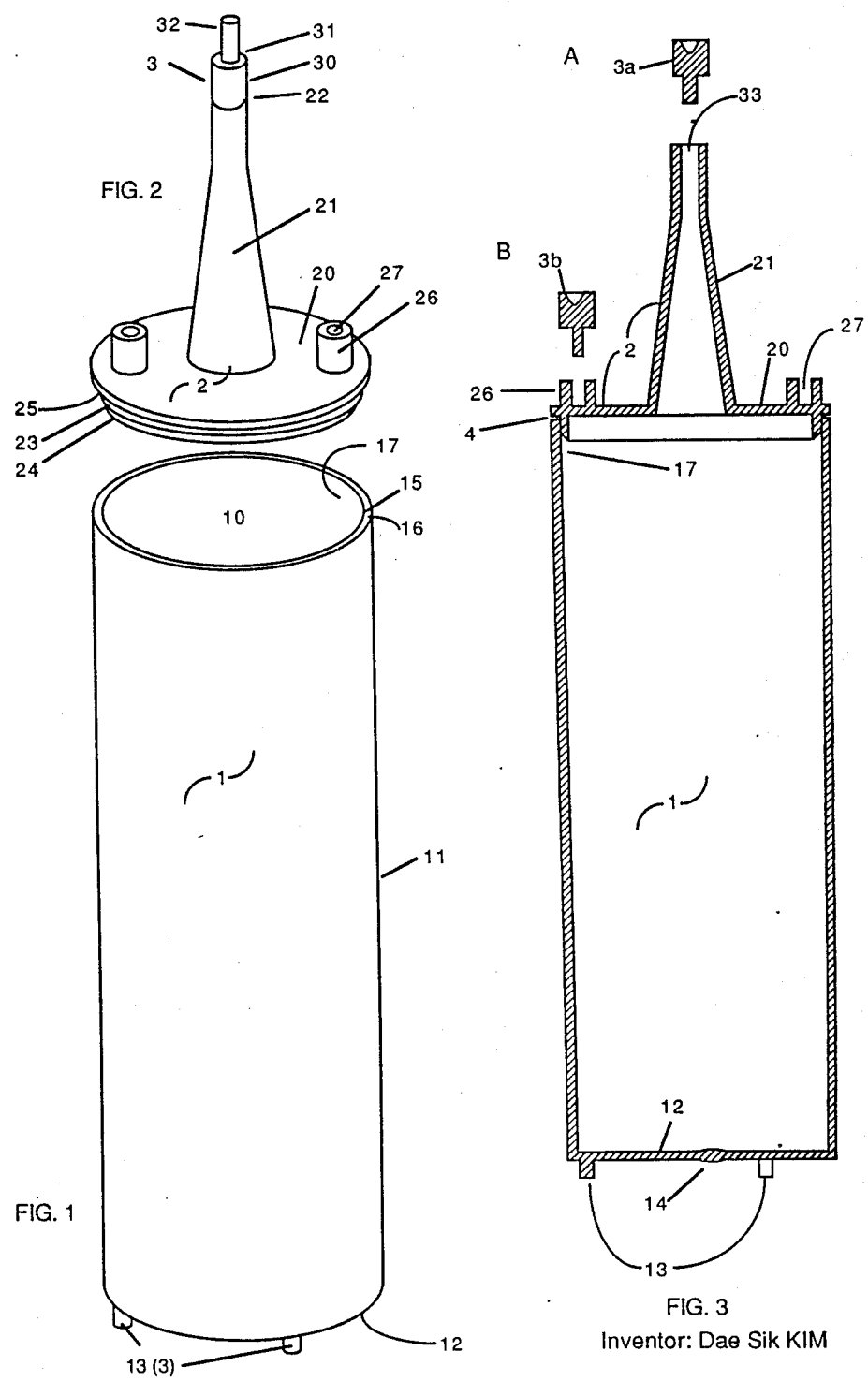

SPIN WELDED, TAMPER-PROOF, RESEALABLE THERMOPLASTIC CONTAINER

BACKGROUND OF THE INVENTION

1. Field of the Invention

This invention relates to a tamper-proof container. More specifically, the invention relates to a spin welded, thermoplastic, resealable container, where an opening is formed by separating a predetermined part of the container, and the separated part becomes a tight-sealing closure.

2. Description of the Prior Art

Ever since the cyanide-laced Tylenol capsule caused a death in 1982, tamper-evident packaging became necessary and mandatory for some consumer products. Many tamper-evident systems have been proposed and many new systems have been introduced to market. More popular, tamper-evident, resealable packaging can be divided into two general types: ones which involve mainly modification of conventional closures, and others which involve additional layers of packaging.

The first type includes closures with built-in, break-away, perforated neck bands. These require a slight modification in the neck of conventional bottles but very little modification on the existing filling and capping equipment. Vacuum safety buttons and oxidative color indicators are other examples of this type. These systems require no modification to the bottles but require packaging in a vacuum or inert atmosphere and gas-tight caps. Unless vacuum or inert gas provides other benefits, such as the improved preservation of the contents, these requirements are very costly. This type of resealable, tamper-evident container, especially one with a neck band, is economical for containers with a small opening such as bottles, but totally impractical for containers with a larger opening.

The second type includes an external shrink wrap, and an internal, flexible membrane lidding of the mouth of a bottle. Some shrink wraps cover the whole container, but most cover only critical portions of package, such as the neck of a bottle. The internal lidding has the distinct disadvantage of not being seen before the cap is opened. In general, these tamper-evident containers involve additional parts or processes. Although these systems allow one to utilize the existing containers and packaging systems, the additional steps and parts increase total cost of packaging. Since the packaging industry is mature and capital-intensive, all of the proposed tamper-evident packaging systems confine themselves to the utilization of existing packaging equipment and their simpler modification. This self-imposed restriction is self-serving and not necessarily beneficial to the consumer. Furthermore, these tamper-evident packages can in fact be tampered with. Shrink wrap stretches enough to be removed and break-away bands can be made to override the locking teeth.

On the other hand, more tamper-proof packages are not generally resealable, because to open these packages, one must cut or tear away a portion of the packaging material which is designed to be discarded. The best example is a metal can, which is the most tamper-proof package, but not resealable. For peanuts and other similar products which are removed little at a time, separate, tight-fitting plastic covers are provided for the contents. Blister packs are other popular tamper-proof or resistant package, but they are very difficult to reseal. In the majority of packaging, wed not use all of the contents at once and thus, resealability is essential. It is obvious that we need the safety of tamper-proof packaging with the convenience of resealability.

SUMMARY OF THE INVENTION

The present invention provides means of creating a tamper-proof, thermoplastic container by spin welding separately molded parts; of creating a simple opening for the discharge of the contents by separating a predetermined part of the container, and of creating a tight-fitting closure for the opening from the separated part for easy resealing This invention utilizes spin welding of a molded thermoplastic cup with a circular opening, and a molded thermoplastic cap with a base which mates the circular opening of the cup, to create a tamper-proof packaging after the cup is filled with contents. The cup can either be injection or blow molded. However, injection molding provides a more economical container, as this process allows use of simpler equipment, multi-cavity mold, and higher speed operation. Similarly, injection molding provides better economy for the cap. The thermoplastics for the cap and for the cup are preferably the same materials, but they could be different. The only requirement is that two materials form a good fused seal. For some foodstuffs, the cup and cap could have multi-layered gas barrier walls or their inside surfaces could be treated.

In this invention, the cup is filled with contents through the circular opening. Then, the cap is spin welded on the cup to create a hermetically sealed tamper-proof package. Filling an open cup is a well established packaging process and much easier than filling a bottle. Spin welding of two circular mating thermoplastics is an equally well established process. We have modified a common bench drill press for spin welding. This simple welder with a six-station rotary filling table can package about 12 to 15 squeeze bottles of latex paint per minute. This method is faster and cheaper than filling a conventional blow molded bottle and capping it with a conventional screw cap with a spout. Also the total packaging energy requirement for the spin welded bottles is far less than for conventional screwed closures. Unlike conventional screw closures, spin welding is irreversible and provides a hermetically sealed container which preserves the contents far better.

The hermetically sealed container of this invention is opened (like any other hermetically sealed container, such as a metalcan or heat sealed plastic package) by removing a portion of the packaging material. In this invention, however, the removal must follow a certain predetermined way. Then, the removed portion simply becomes a tight-fitting closure for the opening created. Although either portion, the cup or the cap, can provide the necessary opening and closure, it is more desirable to use the cap, as the opening must be near the extremities of the container and a simpler cup is easier to handle, print and fill.

In this invention, the cap must have a circular base for spin welding on the cup and a special part which can be separated from the base to provide an opening. This separated part becomes a tight-fitting closure. In the simples design, the cup is a simple, slightly tapered cylinder with a wide open end. The cap has a concentric vertical bulge on the circular base and another, slightly smaller concentric bulge on the flat roof of the first bulge, where the external diameter of the smaller bulge is identical to the internal diameter of the larger bulge. In more complex designs, the shape of the bulges can be other cylindrical and the location of the bulges can be other than concentric. However, two bulges must mate. To seal the package, the cap is spin welded onto the filled cup.

To open the container, one should cut along the upper part of the vertical wall of the larger bulge. When reversed, the small bulge plugs into the opening. The horizontal rim of the severed part keeps it from sinking into the opening and holds it in place. This horizontal rim can guide the cut. The only requirement for both vertical walls of the bulges is to provide a mating and sealing surface which can be a cylindrical, square, or screw like surface. For the simple construction of molds, radially symmetrical bulges along the axis of rotation of the circular base are desirable. When the bulges are other than cylindrical, they can be used to hold the cap during spin welding. If the bulges are cylindrical, as in the simple design described above, additional means of holding the cap from rotating are needed. Similarly a means of holding the cup must be provided.

In the squeeze bottle for latex paint which will be illustrated, a set of three radially symmetrical legs on the bottom of the cup were used to hold the cup during welding. These legs keep the container from sliding when placed on wet and smooth surfaces. To hold the cap with a long spout for spin welding, a pair of annular studs are molded in place near the edge of the base. The inside diameter of the annular stud is identical to the diameter of the tip and the inside diameter of the tip of the spout, so that the severed tip can be held by one of the studs while the bottle is in use.

For most thermoplastics, a kitchen or utility knife is good enough to cut off the predetermined part of the cap. To help the cut, one can mark or pre-weaken the wall along the cutting line. To avoid the use of knife, one can use a taped joint of a two part cap, but a pre-weakened wall is simpler and more effective for a larger opening. This type of cutting aid is widely used in metal cans. Since the external surface of the small bulge becomes the internal face of the closure and contacts the contents, this surface must be cleaned. Similarly, the external surface of the closure which was in contact with the contents prior to opening also must be cleaned. This particularly important when the contents are sticky foodstuffs such as jam. Simple washing after separating should be enough.

The size and shape of the opening is predetermined by the particular needs involved in dispensing the contents. For relatively large, solid items such as candy, the opening can be almost as large as the circular base of the cap with a nearly flat, disk-like closure. For liquids, such as catsup or other condiments, the cap should have a long spout with a resealable tip. In this case, the smaller bulge can be none other than the sprue of injection molding. The cup could be a flexible thermoplastic for easy squeezing. As shown by these two extreme examples, this invention can provide wide range of containers for a variety of materials.

In one embodiment, this invention is incorporated into a resealable, hermetically sealed squeeze bottle with two spin welded components, a cup and a cap, which are briefly described hereto. Other purposes and further advantages of my invention will become apparent from a consideration of the drawings and ensuing description thereof.

BRIEF DESCRIPTION OF THE DRAWINGS

FIG. 1 is a perspective view of a cup of a squeeze bottle illustrating one embodiment of the present invention.

FIG. 2 is a perspective view of a matching cap of this embodiment.

FIG. 3 is a cross-sectional view of a spin welded squeeze bottle illustrating a detailed placement of the sealing tip.

DESCRIPTION OF THE PREFERRED EMBODIMENT

Referring to both FIG. 1 and FIG. 2, and to FIG. 3 for detail, a tamper-proof squeeze bottle consists of a molded thermoplastic cup 1 and a cap 2 which are molded in identical or similar thermoplastic. The cup has a wide open top 10, a slightly tapered cylindrical wall 11, and a circular closed bottom 12. This cup is substantially similar to any injection molded cup except for the following critical features. The exterior surface of the bottom 12 has three cylindrical legs 13, which are arranged in equal distance to each other near the edge of the bottom 12. These three legs 13 help to overcome an irregular remain 14 of a hot runner gate, and are used to hold the cup during spin welding. The wall 11, the bottom 12, and the walls of the cup 2 can be a simple single layer, a single layer with a specially treated inside surface (not shown), or a multi-layer gas barrier type (not shown) depending on the contents and their storage requirements. The upper, inside, circular edge 15, the adjacent annular narrow surface 16, and the upper part of the inside wall 17 provide an important welding surface.

A hermetically sealed squeeze bottle is constructed by first filling the cup 1 with contents, and by spin welding the cap 2 onto the cup 1 to form a fused joint 4. This process seals the opening 10 irreversible. The cap 2 is a single, molded, thermoplastic piece, which has a circular base 20 and a spout 21 with a specially designed tip 3. Additionally, the base has two identical cylindrical studs 26 with a blind hole 27, located on the diametrically opposed ends, near the edge of the base 20. On the other side, the circular base 20 has a concentric ring 23 with a beveled exterior edge 24. The diameter of the base is substantially identical to the external diameter of the cup. The exterior diameter of the ring 23 is substantially identical to the internal diameter of the opening 10. There is a narrow circular surface 25 around the ring 23. For spin welding, the vertical exterior surface of the ring 23 mates with the internal top surface 17, and the surface 25 mates with the top of the cup 16. These two pairs of mating surfaces define the radial and axial motion of the spin welding. Heat from friction fuses these two contacting surfaces. The beveled part of the ring 24 helps to place the cap on the cup by sliding over the edge 15 in an automatic sealing operation. The pair of studs 26 is used to hold the cap 2 for spin welding. The base 20 and spout 21 are used to center and position the cap. The tip 3 is indicated by a cutting line or pre-weakened line 22. To open the container, one can cut or break off the tip 3 from the rest of cap at the line 22. The separated part, the tip, has a cylindrical base 30, another smaller, concentric cylindrical plug 32, and a connecting shoulder 31. Separation of the tip 3 exposes a circular opening 33, with a diameter substantially identical to the diameter of the plug 32. The diameter of blind holes 27 is also identical to that of the plug. While the bottle is in use, the tip 3 is held in either blind hole 27, as indicated in B. To reseal, the plug 32 is placed into the opening 33, as indicated in A. The shoulder 31 provides another sealing surface. A molding sprue can be used as the plug 32. The length and size of each part is subject to the particular dispensing needs and the flow properties of the contents. For common household products, these drawings are near optimum scale where the cup 1 is two inches in diameter.

While the above description contains many specificities, these should not be construed as limitations on the scope of the invention, but rther as an exemplification of one preferred embodiment thereof. Many other variations are possible. For example, a large mouthed jar, which is briefly described in the summary of the invention, would be one of simple designs. The materials of construction need not be plastics. Metals also make good fused joints. This invention is applicable to almost all kinds of household packages, which are now in the form of glass jars, metal cans or bottles. Accordingly, the scope of the invention should be determined not by the embodiment illustrated, but by the appended claims and their legal equivalents.

What is claimed is:

1. A tamper-proof, resealable container comprising: an open-top cylindrical container including a circular opening proximate a first end of said container; holding means, including three radially symmetrical legs, disposed on a second, closed end of said container for preventing rotation of said container about its central axis; a cap having a circular base for forming a spin welded joint with the circular opening of said container; said cap also including a predetermined part opposite the base of said cap which provides an opening upon removal and becomes a tight fitting resealable closure for said opening when reversed, said predetermined part comprising a cylindrical base having an outside dimension substantially identical to the outside dimension of the cap around said opening, and a cylindrical plug having an outside dimension substantially identical to the inside dimension of said opening; means, located proximate the base of said cap, for holding said cap from rotating about its central axis, said means for holding said cap from rotating including means for storing said predetermined part when removed from the dispenser cap; and means for aiding removal of said predetermined part from said cap.

2. The container of claim 1 wherein said means of aiding removal is a cut line indicating the said predetermined part from the said base of cap.

3. The container of claim 1 wherein said open-top cylindrical container and said cap are injection molded thermoplastic articles.

4. The container of claim 1 wherein said cylindrical plug is a sprue of injection molding.

5. The container of claim 1 wherein said open-top cylindrical container and said cap are optically clear molded thermoplastic articles for the good visibility of contents.

6. The container of claim 1 wherein said open-top cylindrical container is made of a flexible thermoplastic for easy squeezing.

7. The container of claim 1 wherein said means of holding is radial asymmetry of said cap along said rotational axis of said circular base.

8. The container of claim 1 wherein said means for aiding removal is a preweakened ring along the cylindrical base of said predetermined part.

9. The container of claim 1 in which said means for holding said cap includes one or more studs located on the base of said cap.

10. The container of claim 9 in which said studs include a blind hole having an inside diameter substantially identical to the outside diameter of said cylindrical plug, for storing said predetermined part while the container is open.

11. A tamper-proof, resealable container comprising: a cup having a circular opening for filling prior to welding, and a holding means of said cup from rotating around the rotational axis of said circular opening; a cap having a circular base, which mates and forms a spin welded joint with the wall around said circular opening of said cup, a means of holding said cap from rotating around the rotational axis of said circular base, and a predetermined part, which provides an opening upon removal and becomes a tightfitting resealable closure for the said opening when reversed; said predetermined part including a rim having an outline substantially identical to the outline of the wall around said opening, and further including a plug having an outline substantially identical to the shape of said opening; a means of joining said cup to said cap; and a means of aiding removal of said predetermined part; said means of holding including a stud having an external diameter substantially identical to the internal diameter of said plug to hold said predetermind part while the container is open.

12. A tamper-proof resealable container comprising: a cup having a circular mouth and a base including three leveling legs for holding the cup against rotation; a cap having a circular base for forming a spin weld with the circular mouth of said cup; said cap including a removal tip opposite the base to provide an opening upon removal and said tip including a plug to provide a tight-fitting resealable closure for said opening; a stud on said cap, said stud having a blind hole adapted to receive said plug, for holding said cap against rotation during the formation of said spin weld and for holding said tip after removal from said cap.

* * * * *